US009509905B2

United States Patent
Gordon et al.

(10) Patent No.: US 9,509,905 B2
(45) Date of Patent: Nov. 29, 2016

(54) EXTRACTION AND REPRESENTATION OF THREE-DIMENSIONAL (3D) AND BIDIRECTIONAL REFLECTANCE DISTRIBUTION FUNCTION (BRDF) PARAMETERS FROM LIGHTED IMAGE SEQUENCES

(71) Applicant: Google Inc., Mountain View, CA (US)

(72) Inventors: Ariel Gordon, Haifa (IL); Ehud Rivlin, Haifa (IL)

(73) Assignee: Google Inc., Mountain View, CA (US)

( * ) Notice: Subject to any disclaimer, the term of this patent is extended or adjusted under 35 U.S.C. 154(b) by 350 days.

(21) Appl. No.: 14/108,358

(22) Filed: Dec. 17, 2013

(65) Prior Publication Data

US 2015/0172636 A1  Jun. 18, 2015

(51) Int. Cl.
*H04N 5/232* (2006.01)
*H04N 5/235* (2006.01)
*G06T 15/50* (2011.01)

(52) U.S. Cl.
CPC ......... *H04N 5/23229* (2013.01); *G06T 15/506* (2013.01); *H04N 5/2354* (2013.01)

(58) Field of Classification Search
CPC ............ G06T 15/506; H04N 5/23229; H04N 5/2354
USPC .......................................................... 348/46
See application file for complete search history.

(56) References Cited

U.S. PATENT DOCUMENTS

| 2004/0150643 | A1* | 8/2004 | Borshukov | ........... G06T 7/0065 345/426 |
| 2009/0052767 | A1* | 2/2009 | Bhalerao | ................ G06T 17/20 382/154 |
| 2009/0222701 | A1* | 9/2009 | Song | ................... G06F 11/1012 714/704 |
| 2010/0289878 | A1* | 11/2010 | Sato | ................... H04N 13/0239 348/46 |
| 2013/0271461 | A1* | 10/2013 | Baker | ..................... G06T 15/50 345/420 |
| 2013/0328900 | A1* | 12/2013 | Takahashi | ............. G06T 11/001 345/582 |
| 2015/0016711 | A1* | 1/2015 | Tin | ........................ G06T 7/0004 382/152 |
| 2016/0142587 | A1* | 5/2016 | Moribe | ................ H04N 1/3871 382/167 |

OTHER PUBLICATIONS

M. Ashikhmin et al., "An Anisotropic Phong Light Reflection Model", Jun. 2000, University of Utah Computer Science Department Technical Report No. UUCS-00-014, available at http://www.cs.utah.edu/research/techreports/2000/pdf/UUCS-00-014.pdf (last visited Feb. 3, 2014).

R. L. Cook et al., "A Reflectance Model for Computer Graphics", Jan. 1982, ACM Transactions on Graphics, vol. 1, No. 1, pp. 7-24.

(Continued)

*Primary Examiner* — James Boylan
(74) *Attorney, Agent, or Firm* — McDonnell Boehnen Hulbert & Berghoff LLP

(57) ABSTRACT

Methods and systems are provided that use images to determine lighting information for an object. A computing device can receive an image of the object. For a pixel of the image, the computing device can: apply a first lighting model to determine a first estimate of a bi-directional lighting function (BRDF) for the object at the pixel, apply a second lighting model to determine a second estimate of the BRDF for the object at the pixel, determine a third estimate of the BRDF based on the first and second estimates, and store the third estimate of the BRDF in lighting-storage data. The computing device can provide the lighting-storage data. The BRDF can utilize a number of lighting parameters, such as a normal vector and albedo, reflectivity, and roughness values.

20 Claims, 7 Drawing Sheets

(56) References Cited

OTHER PUBLICATIONS

K. J. Dana et al., "Reflectance and Texture of Real-World Surfaces", Jan. 1999, ACM Transactions on Graphics, vol. 18, No. 1, pp. 1-34.
T. Maltzbender et al., "Polynomial Texture Maps", Aug. 12, 2001, ACM 2001 Conference on Computer Graphics and Interactive Techniques (SIGGRAPH), pp. 519-528, available at http://www.hpl.hp.com/research/ptm/papers/ptm.pdf (last visited Feb. 3, 2014).
S. Narasimhan, "Basic Principles of Surface Reflectance", Sep. 22, 2009, available at http://www.cs.cmu.edu/afs/cs/academic/class/15462-f09/www/lec/lec8.pdf (last visited Feb. 3, 2014).
M. Oren et al, "Generalization of Lambert's Reflectance Model", Jul. 1994, ACM 21st Annual Conference on Computer Graphics and Interactive Techniques (SIGGRAPH), pp. 239-246, available at http://www1.cs.columbia.edu/CAVE/publications/pdfs/Oren_SIGGRAPH94.pdf (last visited Feb. 3, 2014).
S. C. Pont et al,"Bidirectional Reflectance Distribution Function of Specular Surfaces with Hemispherical Pits", Dec. 2002, J. Opt. Soc. Am. A, vol. 19, No. 12, pp. 2456-2466.
D. Ramanan, "Lecture 4—Apr. 13", Apr. 13, 2009, CS 217: Light and Geometry in Vision Course Lecture Notes, University of California—Irvine, available at http://www.ics.uci.edu/~dramanan/teaching/cs217_spring09/lec/lec6.pdf (last visited Feb. 3, 2014).
Scratchapixel, "0.18, Stop and Exposure Explained", Jan. 1, 2011, available at http://www.scratchapixel.com/lessons/3d-advanced-lessons/things-to-know-about-the-cg-lighting-pipeline/0-18-stop-and-exposure-explained/ (last visited Feb. 3, 2014).
Scratchapixel, "What is a BRDF?", Jan. 1, 2011, available at http://www.scratchapixel.com/lessons/3d-advanced-lessons/things-to-know-about-the-cg-lighting-pipeline/what-is-a-brdf/ (last visited Feb. 3, 2014).
S. Seitz, "Photometric Stereo", Lecture Notes for Feb. 9, 2005, available at https://courses.cs.washington.edu/courses/csep576/05wi/lectures/photostereo.ppt (last visited Feb. 3, 2014).
K. E. Torrance et al., "Theory for Off-Specular Reflection from Roughened Surfaces", Sep. 1967, Journal of the Optical Society of America, vol. 57, No. 9, pp. 1105-1114.
Wikimedia Foundation, Inc., "Bidirectional Reflectance Distribution Function", Sep. 24, 2013, available at http://en.wikipedia.org/wiki/index.php?title=Bidirectional_reflectance_distribution_function&oldid=574274574 (last visited Feb. 3, 2014).
Wikimedia Foundation, Inc., "Oren-Nayar Reflectance Model", Aug. 12, 2013, available at http://en.wikipedia.org/w/index.php?title=Oren%E2%80%93Nayar_reflectance_model&oldid=568241115 (last visited Feb. 3, 2014).
Wikimedia Foundation, Inc., "Photometric Stereo", Jul. 4, 2013, available at http://en.wikipedia.org/w/index.php?title=Photometric_stereo&oldid=562852535 (last visited Feb. 3, 2014).
R. J. Woodham,"Photometric Method for Determining Surface Orientation from Multiple Images", Jan./Feb. 1980, Optical Engineering, vol. 19, No. 1, pp. 139-144.

* cited by examiner

Computing Device 300

Data Storage 304

Instructions 310

Receive pixel, camera, and lighting inputs

Determine a pixel and associated vectors
 (e.g., I and V vectors)

Apply first lighting model to determine first estimates of
 normal and lighting parameters for the pixel Check first estimates for outliers.

If there are any outliers:
 For each outlier: apply second lighting model to
  obtain second estimate of normal and
  lighting parameters Determine third estimate of normal and lighting parameters
 based on first and second estimates Adjust normal for higher order terms Normal and lighting parameter estimates

Lighting Data Storage 320

FIG. 3

EXTRACTION AND REPRESENTATION OF THREE-DIMENSIONAL (3D) AND BIDIRECTIONAL REFLECTANCE DISTRIBUTION FUNCTION (BRDF) PARAMETERS FROM LIGHTED IMAGE SEQUENCES

BACKGROUND

In computer graphics, three-dimensional (3D) modeling involves generation of a representation of a 3D surface of an object. The representation may be referred to as a 3D object data model, or simply a 3D model, and can be rendered or displayed as a two-dimensional image via 3D rendering or displayed as a three-dimensional image. A 3D object data model may represent a 3D object using a collection of points in 3D space, connected by various geometric entities such as triangles, lines, curved surfaces, etc. Various techniques exist for generating 3D object data models utilizing point clouds and geometric shapes.

SUMMARY

In a first aspect, a method is provided. The method includes a computing device receiving an image of an object. The image includes a plurality of pixels. For a designated pixel of the image, the computing device: determines a first estimate of a bi-directional lighting function (BRDF) of the object for the designated pixel by applying a first lighting model, determines a second estimate of the BRDF of the object for the designated pixel by applying a second lighting model, where the first lighting model differs from the second lighting model, determines a third estimate of the BRDF of the object for the designated pixel based on the first estimate of the BRDF and the second estimate of the BRDF, and stores at least the third estimate of the BRDF in lighting-storage data. The computing device provides the lighting-storage data.

In another aspect, a computing device is provided. The computing device includes a processor and a non-transitory computer-readable medium. The non-transitory computer-readable medium is configured to store at least lighting storage data and program instructions. The program instructions, when executed by the processor, cause the computing device to carry out functions. The functions include: (a) receiving an image of an object, where the image includes a plurality of pixels; (b) for a designated pixel of the image: (b1) determining a first estimate of a BRDF of the object for the designated pixel by applying a first lighting model, (b2) determining a second estimate of the BRDF of the object for the designated pixel by applying a second lighting model, where the first lighting model differs from the second lighting model, (b3) determining a third estimate of the BRDF of the object for the designated pixel based on the first estimate of the BRDF and the second estimate of the BRDF, and (b4) storing at least the third estimate of the BRDF in the lighting-storage data; and (c) providing the lighting-storage data.

In another aspect, a non-transitory computer-readable medium is provided. The non-transitory computer-readable medium is configured to store program instructions that, when executed by a processor of a computing device, cause the computing device to carry out functions. The functions include: (a) receiving an image of an object, where the image includes a plurality of pixels; (b) for a designated pixel of the image: (b1) determining a first estimate of a BRDF of the object for the designated pixel by applying a first lighting model, (b2) determining a second estimate of the BRDF of the object for the designated pixel by applying a second lighting model, where the first lighting model differs from the second lighting model, (b3) determining a third estimate of the BRDF of the object for the designated pixel based on the first estimate of the BRDF and the second estimate of the BRDF, and (b4) storing at least the third estimate of the BRDF in the lighting-storage data; and (c) providing the lighting-storage data.

In another aspect, an apparatus is provided. The apparatus includes: means for receiving an image of an object, where the image includes a plurality of pixels; means for a designated pixel of the image: determining a first estimate of a BRDF of the object for the designated pixel by applying a first lighting model, determining a second estimate of the BRDF of the object for the designated pixel by applying a second lighting model, where the first lighting model differs from the second lighting model, determining a third estimate of the BRDF of the object for the designated pixel based on the first estimate of the BRDF and the second estimate of the BRDF, and storing at least the third estimate of the BRDF in the lighting-storage data; and means for providing the lighting-storage data.

BRIEF DESCRIPTION OF THE DRAWINGS

FIG. 3 is a block diagram of a computing device, in accordance with an example embodiment.

DETAILED DESCRIPTION

Overview

Figure 1:
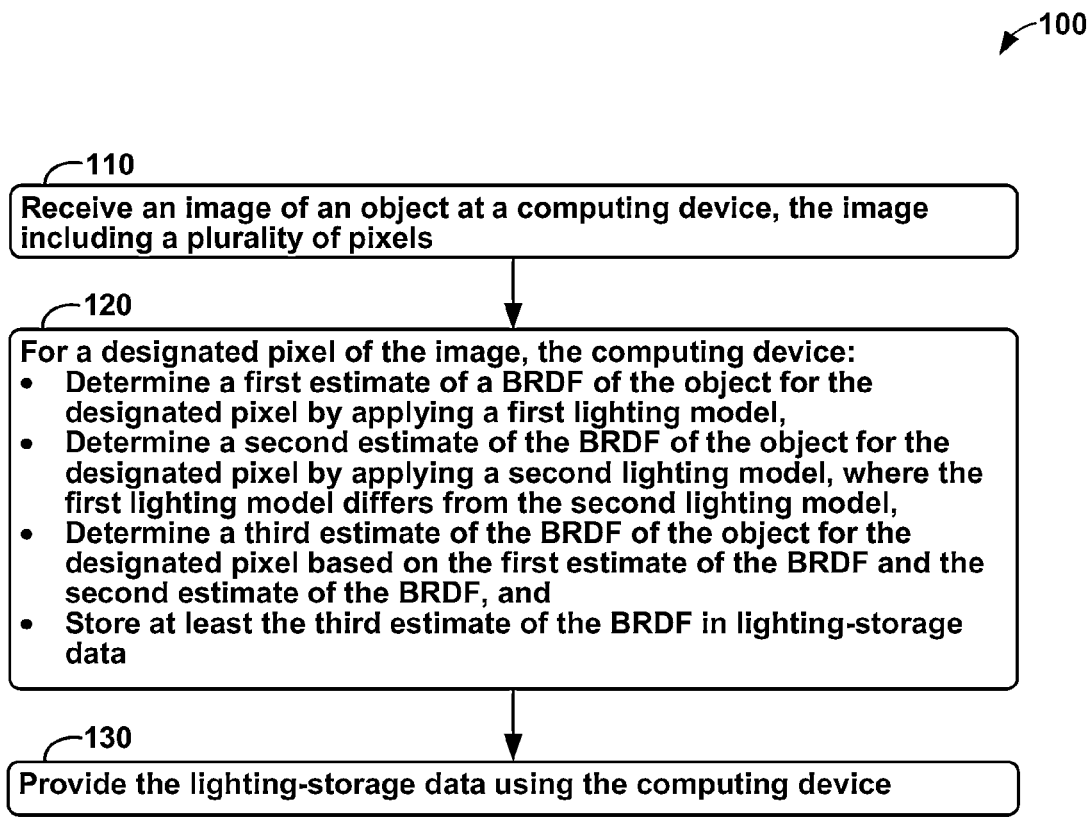
FIG. 1 is a flowchart of a method, in accordance with an example embodiment.

Example embodiments disclosed herein relate to determining a three-dimensional (3D) model of an object from one or more two-dimensional (2D) images. In order to display 3D objects, the 3D model can include information about geometry and optical properties of surfaces of the object. A lighting model, such as a BRDF, can utilize lighting parameters specifying the geometry and optical properties to describe how light interacts with the 3D object. Then, the lighting model can be used to display the 3D object.

The BRDF lighting model can model light reflected from the object and then captured by a camera, or other imaging device, as having diffuse and specular components. A diffuse component of light can be light reflected in many directions from the object and the specular component of light can be light reflected in a specific direction from the object. In general terms, light captured in an image related to a specular component of a light can have a bright or shiny appearance in the image, while light related to a diffuse component can have a flat or matte appearance in the image.

Lighting models including or based on the BRDF lighting model can utilize a normal vector to the surface at a location to model the geometry of the object. A normal vector at a location on a surface of the object is a vector perpendicular to the surface at the location. Other vectors, such as a view vector from the location to the camera and an incident light vector from a light source to the location, can be used by the lighting model as well.

Along with these vector lighting parameters, scalar lighting parameters can be utilized as well. For example, an albedo parameter can be used to model an amount of diffuse light reflected from the object at a location. The albedo can be specified in terms of light frequencies; e.g., for a red-green-blue (RGB) color model often used in computer graphics, the albedo can be specified for red light, green light, and blue light. A reflectivity or specularity parameter can model an amount of specular light reflected from the object at the location. A roughness parameter can be used to model the roughness or smoothness (in the sense of not-roughness) of a surface. Other vector and scalar lighting parameters are possible as well.

After capturing one or more images of the object, values of received light indicated by pixels of the image can be used as inputs to one or more lighting models to determine vector and scalar lighting parameters of the object. For example, the light reflected from the object and captured by the camera to generate the image can be initially assumed or designated to be diffuse light. One pixel of the captured image that depicts part of the object can be associated with a location on the object. Then, a first lighting model, such as a diffuse lighting model, can be used to determine lighting parameters for the object at the location associated with the pixel.

Once the first lighting model has been applied to all pixels, some or all of the parameters can be checked for consistency with lighting parameters for other locations on the object; e.g., parameters generated for neighboring pixels in the image. Outlier values, or values with lighting parameters that are not consistent under various lighting conditions, can be determined. A second lighting model, such as a specular lighting model, can be used to determine lighting parameters for the object at each location associated with outlier values. Lighting parameters for a pixel in the image can be determined as parameters obtained from the first lighting model only, parameters obtained from the second lighting model only, or combinations of parameters obtained from the first lighting model and parameters obtained from the second lighting model. In some embodiments, more than two lighting models can be used to obtain lighting parameters—these lighting parameters can be obtained from only one lighting model or from combinations of some or all of the lighting models.

If multiple images are used, then lighting parameters can be obtained for each pixel of each image. The lighting parameters from multiple images can be combined; e.g., using a least-squares algorithm, to determine lighting parameters for the object. These lighting parameters then can be used to physically and/or graphically model the object. Once determined, the lighting parameters for the object can be compressed to save data storage space. For example, if the lighting parameters include a normal vector, an albedo value, a reflectivity value, and a roughness values, then compressed versions of these parameters can be generated so that the stored data takes up no more space than three uncompressed images.

That is, the lighting parameter data can model an object depicted using large number of images and provide information for displaying and modeling the object under most, if not all, lighting conditions using no more data than three images, which can save a great amount of storage and enable rendering of the object under any lighting conditions. Using multiple lighting models, such as a diffuse lighting model and a specular lighting model, can be used to generate models of a wide variety of objects, including objects with a large number of shiny components; e.g., vehicles, home appliances, metal tools, apparel. Further, complex 3D scanning devices need not be used to generate 3D models of objects; rather a still camera or other imaging device (e.g., a video camera, a motion camera) can be used to obtain data used to generate 3D models of objects.

Example Operations

FIG. 1 is a flowchart of method 100, in accordance with an example embodiment.

Method 100 can be carried out by a computing device, such as computing device 700. As such, method 100 can be a computer-implemented method. Method 100 can begin at block 110. At block 110, the computing device can receive an image of an object. The image can include a plurality of pixels.

At block 120, for a designated pixel of the image, the computing device can: determine a first estimate of a BRDF of the object for the designated pixel by applying a first lighting model, determine a second estimate of the BRDF of the object for the designated pixel by applying a second lighting model, where the first lighting model differs from the second lighting model, determine a third estimate of the BRDF of the object for the designated pixel based on the first estimate of the BRDF and the second estimate of the BRDF, and store at least the third estimate of the BRDF in lighting-storage data.

In some embodiments, determining the second estimate of the BRDF can include determining whether the first estimate of the BRDF is an outlier estimate. Then, after determining that the first estimate of the BRDF is the outlier estimate, determining the second estimate of the BRDF can include determining the second estimate of the BRDF for the object at the designated location by applying the second lighting model.

In other embodiments, the first lighting model can be configured to model diffuse reflection of light. In particular embodiments, determining the first estimate of the BRDF for the object can include determining a value of an albedo of the object for the designated pixel and a normal vector of the object for the designated pixel.

In still other embodiments, the second lighting model can be configured to model specular reflection of light. In particular embodiments, determining the second estimate of the BRDF for the object can include determining a reflectivity value of the object for the designated pixel.

In even other embodiments, the BRDF is associated with at least one lighting parameter value. Then, storing at least the third estimate of the BRDF in the lighting-storage data can include: determining a pre-determined number of bits to store the at least one lighting parameter value for the third estimate of the BRDF and storing the at least one lighting parameter value for the third estimate of the BRDF using no more than the pre-determined number of bits; e.g., 64 or 72 bits.

At block 130, the computing device can provide the lighting-storage data. In some embodiments, the lighting-storage data can be configured to store, for each pixel of the plurality of pixels, at least an estimate of a normal vector, an albedo value, a reflectivity value, and a roughness value.

In some embodiments, method 100 can additionally include that the computing device can, for a second designated pixel of the image that differs from the designated pixel: determine a first estimate of a BRDF of the object for the second designated pixel by applying the first lighting model, determine whether the first lighting model does model the object for the second designated pixel, and after determining that the first lighting model does model the object for the second designated pixel, store at least the first estimate of the BRDF at the second designated location in the lighting-storage data.

In other embodiments, method 100 can additionally include: receiving a second image of the object at the computing device, where the second image includes a second plurality of pixels. Then, for a third designated pixel of the second plurality of pixels, the computing device can determine a second-image estimate of a BRDF of the object for the third designated pixel by applying at least the first lighting model. The computing device can determine a first-image estimate of the BRDF of the object for the third designated pixel, where the first-image estimate is determined for a pixel of the plurality of pixels that corresponds to the third designated pixel. Then, the computing device can determine a combined estimate of the BRDF of the object for the third designated pixel by combining the first-image estimate and the second-image estimate.

Determining Three-Dimensional Object Properties from Object Images

Figure 2A:
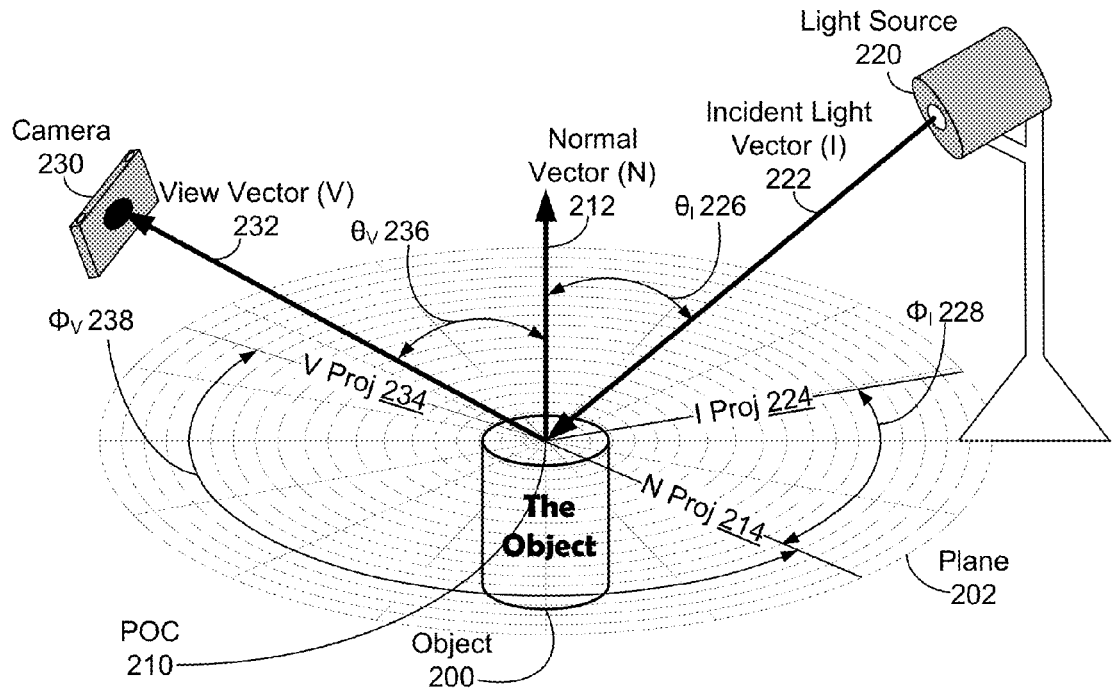
FIG. 2A shows light reflected from an object and captured by a camera, in accordance with an example embodiment.

FIG. 2A shows light provided by light source 220, reflected from object 200, and captured by camera 230, in accordance with an example embodiment. Object 200 can be any object that may reflect light. Light source 220 can be any device configured to emit light, such as but not limited to one or more: electrically powered light sources (e.g., light bulbs, light emitting diodes (LEDs), flashlights, halogen lamps, fluorescent lamps, lasers, monitors), natural light sources (e.g., the Sun, moon, stars, Northern/Southern lights, lightning, bioluminescent), combustible light sources (e.g., fire, torches, candles, gas lights, kerosene/oil lamps), and combinations thereof.

Camera 230 can be a device configured to capture light and store a record of captured light, such as but not limited to, still cameras, video cameras, cameras embedded in other devices (e.g., a smartphone camera), film cameras, digital cameras, and combinations thereof. Many other types of light sources and cameras are possible as well.

Some of the light provided by light source 220 shines along incident light vector (I) 222 to point of contact (POC) 210 in plane 202 on a top of object 200. For example, plane 202 can be a tangent plane to object 200 at location X 210. Upon reaching point of contact 210, a portion of the light reflects from object 200 to camera 230 along view vector (V) 232.

A normal vector N' to a point P on a surface S is a vector that is perpendicular to a tangent plane at P of surface S. For example, normal vector (N) 212 to (the top of) object 200 at point of contact 210 is shown in FIG. 2A. FIG. 2A shows that each of vectors N 212, I 222, and V 232 are in three dimensions, and indicates two-dimensional angles between vector N 212 and each of vectors I 222 and V 232. Both the incident vector I and reflected light vector R can be specified in terms of the normal vector N. For example, vectors I 222 and V 232 can be specified in terms of respective solid angles $\omega_I$, $\omega_V$ between each respective vector and normal vector N 212. As another example, a vectors, such as vector I 222 or vector V 232, can be specified in terms of a pair of angles ($\theta$, $\phi$), where $\theta$ is the angle between the vector and normal vector N in a plane NP perpendicular to plane 202 that contains vector N, and where $\phi$ is an angle between the projection of the vector into plane 202 and a projection of vector N into plane 202. FIG. 2A shows vector I specified in terms of a pair of angles ($\theta_I$, $\phi_I$), where $\theta_I$ 226 lies in perpendicular plane NP (plane NP not shown in FIG. 2A to reduce complexity of the Figure), and $\phi_I$ 228 is an angle between N projection 214 and I projection 224 in plane 202. FIG. 2A also shows vector V specified in terms of a pair of angles ($\theta_V$, $\phi_V$), where $\theta_V$ 236 lies in perpendicular plane NP and $\phi_V$ 238 is an angle between N projection 214 and V projection 234 in plane 202.

A model of interaction between light emitted by light source 220 and object 200 as captured at camera 230 can be determined. For example, a BRDF can model how light is reflected from object 200, assuming object 200 at position X is opaque. The BRDF can be specified as a function $$f = \frac{dL_V(\omega_V)}{dE_I(\omega_I)},$$

where $L_V$ is a radiance of light emitted by light source 220 along vector V 232 and E is an irradiance of light emitted by light source 220.

Various BRDFs can model light under different assumptions about object(s) reflecting light, such as object 200. One such model that is based on an assumption that object 200 is a perfectly diffuse object. A perfectly diffuse object (or surface) reflects incident light equally in all directions; e.g., a smooth matte object or surface. Light reflected from a perfectly diffuse object can be modeled using a lighting model shown as Equation 1 below:

$$L_{RD} = \frac{\rho}{\pi}\cos\theta_I L_I, \qquad (1)$$

where: $L_{RD}$ is the reflected diffuse radiance of light,
$\rho$ is the albedo of a surface of object 200 for white light at point of contact 210,
$\pi$ is the ratio of the circumference of a circle to the circle's diameter; e.g., the value 3.14159 . . . ,
$\theta_I$ is $\theta_I$ 226 as shown in FIG. 2A, and
$L_I$ is the radiance of light emitted from a light source that is reflected from the object 200; e.g., light emitted from light source 220 that reaches point of contact 210 and is reflected from point of contact 210.

A perfectly diffuse surface would have to be smooth, as rough objects have facets that can reflect light in particular directions. Example rough diffuse objects are concrete bricks, sand, and wall plaster—many other rough diffuse objects are possible as well.

A diffuse lighting model for rough diffuse surfaces is shown as Equation 2 below:

$$L_{RD} = \frac{\rho}{\pi}\cos\theta_I[A + (B\max[0, \cos(\varphi_V - \varphi_I)]\sin(\alpha)\tan(\beta))]L_I \qquad (2)$$

where: $L_{RD}$, $\rho$, $\pi$, $\theta_I$, and $L_I$ are as indicated above for Equation (1), $$A = 1 - \frac{\sigma^2}{2(\sigma^2 + 0.33)},$$

$$B = 0.45 \frac{\sigma^2}{\sigma^2 + 0.09},$$

$\phi_V$ is $\phi_V$ 238 as shown in FIG. 2A,
$\phi_I$ is $\phi_I$ 228 as shown in FIG. 2A,
$\alpha = \max(\theta_V, \theta_I)$, with $\theta_V$ being $\theta_V$ 236 as shown in FIG. 2A,
$\beta = \min(\theta_R, \theta_I)$,
$\sigma$=the roughness of a surface of object 200 at point of contact 210 with $\sigma$ in the range [0,1]

In the lighting model of Equation 2 above, if the roughness parameter $\sigma$=0, then A=1, B=0, and Equation 2 simplifies to Equation 1. As such, Equation 2 is a lighting model than can model perfectly diffuse surfaces and roughened surfaces based on the selection of the roughness parameter $\sigma$.

In contrast to the above-mentioned diffuse surfaces that reflect light in all (or many) directions, specular surfaces reflect light in a single direction. Specular surfaces have "shiny spots" where incoming light is reflected directly back to a viewer. Some example specular surfaces include, but are not limited to, mirrors and highly-polished metal surface—many other specular surfaces and objects are possible as well.

Figure 2B:
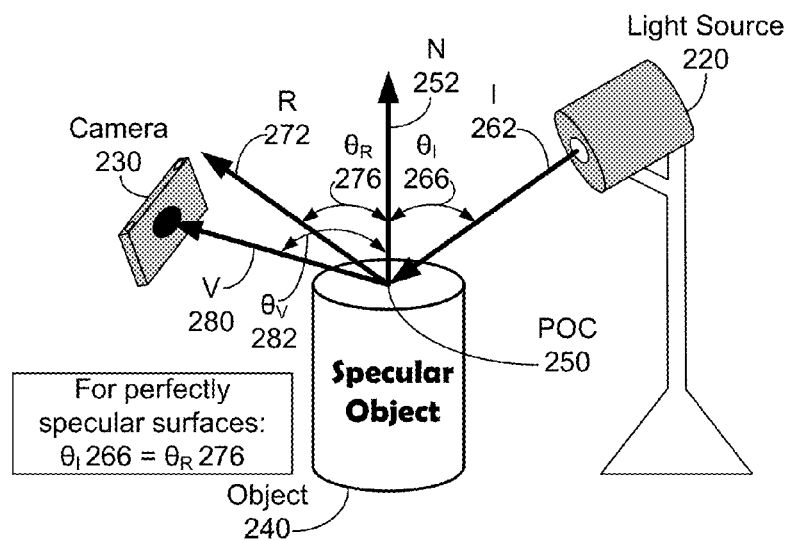
FIG. 2B shows light reflected from a specular object and captured by a camera, in accordance with an example embodiment.

FIG. 2B shows light from light source 220 reflected from specular object 240 and captured by camera 230, in accordance with an example embodiment. In particular, FIG. 2B shows light emitted from light source 220 following incident light vector I 262 reaches point of contact 250 on a specular surface of object 240 and is reflected along reflected light vector R 272. Normal vector N 252 is a normal vector to object 240 at point of contact 250, $\theta_I$ 266 is an incident-light angle between vector N 252 and vector I 262, and $\theta_R$ 276 is a reflected light angle between vector N 252 and vector R 272. A view vector V 280 can be determined from point of contact 250 to camera 230 and angle $\theta_V$ 282 can be determined between normal vector N 252 and view vector V 280.

For specular surfaces, reflected light is reflected at a "mirror angle" or a same, but opposite, angle about a normal vector at a point of contact of the incident light on the object. For the example object shown in FIG. 2B, reflected-light angle $\theta_R$ 276 is the mirror angle to incident-light angle $\theta_I$ 266 about vector N 252. Then, reflected-light vector R 272 can be called a mirror vector to incident light vector I 262. As such, reflected light traveling along mirror vector R 272 can include light reflected due to specularity of object 240 at point of contact 250.

An example model of specular light is shown as Equation 3 below:

$$L_{RS} = L_I (R \cdot V)^n, \quad (3)$$

where: $L_{RS}$ is the reflected specular radiance of light,
$L_I$ is the radiance of light emitted from a light source that contacts a specular object; e.g., light emitted from light source 220 that reaches object 240 at point of contact 250
R is a mirror vector; e.g., R 272 shown in FIG. 2B, and
V is a view vector; e.g., V 280 shown in FIG. 2B, and
n is a selectable parameter; n>0.

Another specular lighting model that takes roughness of a surface into account is shown as Equation 4:

$$L_{RS} = L_I \frac{e^{\frac{-\tan\alpha}{m^2}}}{\pi m^2 (\cos\alpha)^4} \quad (4)$$

where: $L_{RS}$ and $L_I$ are as in Equation 3,
e is the base of the natural logarithm; e.g., 2.71828 . . .
$\alpha = \cos^{-1} N \cdot H$,
m is a measure of a roughness of a surface of an object at a point of contact of light. m can indicate a slope of a root-mean-square of facets of material used to make up the surface; e.g., facets that make up a surface of object 240 at point of contact 250,
N is a unit normal vector; e.g., normal vector N 252 that has been scaled so that |N|=1, and
H is a unit angular bisector to N and a view vector V; e.g., a vector that bisects normal vector N 252 and view vector V 280 that has been scaled so that |H|=1.

A lighting model can model both specular and diffuse light reflections, such as indicated as Equation 5:

$$L_R = k_D L_{RD} + k_S L_{RS} \quad (5)$$

where: $L_R$ is the reflected light radiance,
$L_{RD}$ is the reflected diffuse radiance of light, such as modeled using Equation 1, Equation 2, or some other technique,
$L_{RS}$ is the reflected specular radiance of light, such as modeled using Equation 3, Equation 4, or some other technique,
$k_D$ is a weight for a diffuse component of the reflected light radiance, and
$k_S$ is a weight for a specular component of the reflected light radiance, with $k_D k_S = 1$.

Many other models of diffuse reflected light, specular reflected light, and combined diffuse and specular reflected light can be selected and used.

In both Equations 2 and 4, reflected light can be modeled using a BRDF with: (a) parameters for light emitted by a light source, e.g., incident light vector I, angles $\theta_1$, $\phi_1$, and radiance $L_I$; (b) parameters based on a viewing position/reflected light, e.g., view vector V, reflected light vector R, and angles $\theta_V$, $\phi_V$, $\theta_R$, $\phi_R$ ($\phi_R$ not explicitly shown in FIGS. 2A and 2B); and (c) parameters based on an object reflecting emitted light; e.g. normal vector N, roughness values m and $\sigma$, and albedo $\rho$.

In some cases, images of objects, such as object 200 of FIG. 2A and object 240 of FIG. 2B, can be captured. The various parameters of BRDFs/lighting models mentioned above, and perhaps other parameters, can be determined from the images of objects. Some of these parameters, such as normal vectors, albedo, and roughness values, can be used to model the object being imaged. For example, having knowledge of the normal vectors at a number of points on the surface of the object can be used to generate a 3D model of the object. The normal vectors can be determined by inverting lighting models of objects captured in 2D images. Albedo, roughness values, and specular lighting information from a surface can be used to determine properties of materials that make up the object; e.g., a polished chrome object can reflect more specular light than an object uniformly coated with matte paint, so an object O1 with more imaged specular light than another object O2 is more likely to have polished chrome than object O2, while object O2 is more likely to have been coated with matte paint than object O1. Many other examples are possible as well.

FIG. 3 is a block diagram of computing device 300, in accordance with an example embodiment. Computing device 300 can include instructions 310 and lighting storage data 320. For example, computing device 300 can be a computing device such as computing device 700 discussed below at least in the context of FIG. 7A, and instructions 310 and lighting storage data 320 can be stored in data storage 304, such as data storage 704 discussed below at least in the context of FIG. 7A. Instructions 310 can be instructions such as computer-readable program instructions 706 discussed below at least in the context of FIG. 7A.

Computing device 300 can execute instructions 310 to receive inputs, such as pixel, camera, and lighting inputs. Pixel inputs can include one or more images, with each image having a plurality of pixels. For example let an input image Im have pixels Pix1, Pix2, . . . , with each pixel having one or more color values; e.g., if image Im is made up of pixels expressing colors using the RGB color model, then each pixel PIX can have three values: PIX_r, PIX_g, and PIX_b, for values of respective red, blue, and green color components. Each pixel PIX of image Im can be associated with a location Ploc(PIX) in an environment. For example, if image Im is an image of an object, the object and a region around the object can be part or all of the environment; i.e., Ploc(PIX) represents a real-world location. In some embodiments, Ploc(PIX) can be specified in three dimensions; e.g., Ploc(PIX)=(px, py, pz), where px is an X-dimension value of a location in the environment corresponding to PIX, py is a Y-dimension value of the location, and pz is a Z-dimension value of the location. If Im is an image of an object, an input can include values for parameters about the object, such as one or more albedo values for the object, one or more roughness values for the object, and/or other values/parameters.

A camera input can include a location Cloc of a camera in the environment. In some embodiments, the camera location Cloc can be specified as (cx, cy, cz), where cx is the X-dimension value of a camera location in the environment, cy is the Y-dimension value of the camera location, and cz is the Z dimension value of the camera location. Other specifications of Cloc( ) are possible as well.

Lighting inputs can include inputs for a number of light sources NL, NL>0, one or more intensity values In(i), frequency values Fr(i), and perhaps other values for light emitted by a light source, and a location Lloc(i), with i=1, . . . , NL, of light source i in the environment. As with Cloc, Lloc(i) can be specified in terms of X-, Y-, and Z-dimension values in the environment; e.g., Lloc(i)=(lx(i), ly(i), lz(i)). Other specification of light source locations Lloc are possible as well.

Lighting parameters can be determined for each pixel of image Im. In some embodiments, for a given pixel PIX of image Im, a location Ploc(PIX) can be determined. Then, corresponding incident light vectors I(i) can be determined for each light source i; e.g., I(i)=Lloc(i)−Ploc(PIX). In particular embodiments, the incident light vector I(i) can be scaled by the intensity of the light source In(i). In other embodiments, the incident light vector I(i) can be normalized to have length of 1; that is, have a unit length. A view vector from the pixel to the camera V can be determined; e.g., Ploc(PIX)−Cloc. In some embodiments, vector V can be normalized to have length of 1; that is, have a unit length.

In some embodiments, additional vectors can be determined as well. For example, additional vectors discussed in the context of FIG. 2B, such as mirror reflection vector R and unit angular bisector vector H, and perhaps other vectors can be determined.

In other embodiments, a mapping of pixel locations to environmental locations; e.g., Ploc(PIX), may be undetermined. In these embodiments, light sources can be designated with respect to locations in pixel space. Thus, parameters and vectors, such as but not limited to incident light vectors I(i), view vectors V, mirror reflection vectors R, and unit angular bisector vectors H, can be specified in terms of pixel space.

To determine a normal to the object at a location, a first lighting model can be applied. For example, a diffuse lighting model, such as expressed using Equation 1 or Equation 2 above, can be used as the first lighting model. If PIX is expressed using an RGB color model, then a light intensity at a camera for the pixel can be expressed in terms of PIX_r, PIX_g, and PIX_b values. Let PIXRGB=[PIX_r, PIX_g, PIX_b]. Then, if the object has a diffuse surface for pixel PIX, then PIXRGB=ρ(PIX)*$\Sigma_i$(N·I(i)). If there is only one light source, then i=1, and PIXRGB=ρ(PIX)*N·I. For diffuse surfaces, N·I=cos($\theta_I$) and so PIXRGB=ρ(PIX)*cos($\theta_I$). Solving for $\theta_I$ leads to $\theta_I$=arc cos(PIXRGB/ρ(PIX)). Further, if normal N was assumed to be scaled by the albedo, ρ(PIX), then $\theta_I$=arc cos(PIXRGB). Then, a first normal estimate N1 as scaled by ρ(PIX) can be estimated by rotating incident light vector I by $\theta_I$.

In some embodiments, a mapping of physical or lighting-space locations to pixel locations; e.g., Ploc(PIX), can be known; in those embodiments, values discussed above as being based on pixel locations; e.g., p(PIX), can be instead based on the mapping of physical to pixel locations; e.g., p(Ploc(PIX))

A BRDF estimate for a particular location can be compared to BRDF predictions or estimates to determine whether the BRDF estimate for the particular pixel is an outlier BRDF estimate.

In some embodiments, computing device 300 can be configured to estimate BRDF parameters for part or all of an object, such as a normal vector and lighting parameters, such as the albedo, reflectivity, and roughness of the object. For some objects and in some conditions, one estimate of the BRDF parameters can be used to estimate BRDF parameters for the whole object. For example, an image of one planar surface of an object made with one type of material, such as an image of a uniform tabletop lit from above, may have only one set of BRDF estimated parameters for the imaged object. As another example, a many-faceted object made up of several different materials lit using multiple light sources, may have multiple sets of BRDF estimated parameters, such as one set of BRDF estimated parameters per facet, one set of BRDF estimated parameters per material used, one set of BRDF estimated parameters per light source, or some or all combinations thereof.

Then, for a particular pixel PP with pixel value PV, let PV=[$PV_{red}$, $PV_{green}$, $PV_{blue}$] with $PV_{red}$, $PV_{green}$, $PV_{blue}$ being the respective red, green, and blue component values of PV. Also let E be a set of BRDF estimated parameters for a portion of the object imaged using the particular pixel PP. For example, let E={$E_N$, $E_\rho$, $E_m$, $E_R$}, with $E_N$ being an estimated normal for at least the portion of the object with $E_N$=[$x_E$, $y_E$, $z_E$], $E_\rho$ being an estimated albedo for at least the portion of the object, $E_m$ being an estimated roughness for at least the portion of the object, and $E_R$ being an estimated reflectivity for at least the portion of the object. Other BRDF parameters can be estimated as part of the set E as well.

The set E of BRDF estimated parameters can be determined to best fit the measured pixel value PV. For example, once the set E is determined, an estimated pixel value PV_est having respective red, green, and blue component values of $PV\_est_{red}$, $PV\_est_{green}$, and $PV\_est_{blue}$, can be estimated using the BRDF estimated parameters of set E under any lighting conditions, including those under which pixel value PV was acquired.

If there are lighting (or other) conditions where estimated pixel value PV_est differs significantly from pixel value PV, then the lighting (or other) conditions can be treated as outlying conditions. A significant difference can be determined by comparing a pixel value difference PV_diff; e.g., PV_diff=|PV−PV_est|, to a threshold difference value, and a significant difference can be indicated when PV_diff exceeds the threshold difference value In other cases, PV_diff can be determined on a component-by-component basis, and each pixel value component difference can be compared to a pixel value component threshold as discussed above to determine a significant difference in pixel value components. When some or all of the pixel value component differences are determined to be significant difference(s), then pixel value PV can be classified as having a significant difference. Other techniques for determining a significant difference between estimated pixel value PV_est and pixel value PV are possible as well.

BRDF parameters determined for pixels in outlying conditions can be excluded as outlier pixel values. Then, in particular embodiments, a lighting model can be used to determine BRDF parameters for the remaining pixels; i.e., pixels obtained from non-outlying conditions. This lighting model can be selected based on the lighting (or other) conditions that lead to pixel values that match pixel values for pixels obtained from non-outlying conditions. As one example, the outlying conditions can indicate an object with a specular region, then the outlying pixels can be excluded. Then, one lighting model LM1, such as a diffuse lighting model, can be applied to the pixels obtained from non-outlying conditions to determine BRDF/lighting parameters for the object. In some embodiments, another lighting model LM2, such as a specular lighting model, can be applied to the pixels obtained from outlying conditions. Then, the BRDF/lighting parameters obtained using lighting model LM1 can be combined with BRDF/lighting parameters using lighting model LM2 to determine BRDF/lighting parameters for the object.

As a particular example of outlying conditions based on FIG. 2B, suppose camera 230 captures N images of object 240, with each of the N images being of the same size; e.g., an image having R×C pixels arranged in R rows and C columns of pixels. In each of the N images, camera 230 and object 240 remain fixed and lighting conditions change; e.g., light source 220 can move from image to image, light source 220 can provide light of different intensities and/or frequencies from image to image, multiple light sources can be used.

In this example, two fixed pixels can be selected from each image—a pixel P1 at location (r1, c1) in each of the N images and pixel P2 at location (r2, c2) in each of the N images, with 0<r1, r2≤R and with 0<c1,c2≤C. Then, a first lighting model can be applied to the N pixel values for P1 and the N pixel values for P2. In this example, all N pixel values for pixel P1 fit the first lighting model. Then, the first lighting model can be assumed to accurately model object 240 at P1=(r1, c1) in pixel space. However, when the first lighting model is applied to the N pixel values for P2, a number M, 1≤M≤N, of the pixel values do not fit the first lighting model. Then, the M pixels that did not fit the first lighting model can be classified as outliers (and the corresponding lighting conditions classified as outlying conditions) and be set aside. Then, the first lighting model can be reapplied to N−M pixel values that initially fit the first lighting model to determine BRDF/lighting parameters for pixel P2 using the first lighting model. Also, a second lighting model can be applied to M outlier pixels, and fit the second lighting model to determine BRDF/lighting parameters for pixel P2 using the second lighting model. Then, the BRDF/lighting parameters for pixel P2 using the first and second lighting models can be combined, perhaps using an model such as Equation 5 above or Equation 6 below, to determine BRDF/lighting parameters for pixel P2.

In other embodiments, BRDF/lighting parameters for a particular location for a particular set of lighting conditions; e.g., location(s) of light sources, color(s) of light emitted by the light source(s), etc., can be compared to estimated BRDF/lighting parameters for the particular location under other sets of lighting conditions to determine whether the BRDF estimate for the particular location for the particular set of lighting conditions is an outlier. If a difference between an estimate for some or all BRDF/lighting parameters for the particular location under the particular set of lighting conditions and an estimate for the some or all BRDF/lighting parameters for the particular pixel under a different set of lighting conditions exceeds one or more thresholds, then the BRDF/lighting parameters for the particular pixel under the particular set of lighting conditions can be labeled as an outlier parameters.

For a specific example, let a normal vector estimate V1 be equal to [x1, y1, z1] under a set of lighting conditions L1 at a particular position P1 for object 200, and let normal vector estimate V2 be equal to [x2, y2, z2] under lighting conditions L2 at position P2 for object 200. Then, let Tx be a threshold value for an absolute difference in x coordinates of normal vector estimates such as |x1−x2|, let Ty be a threshold value for an absolute difference in y coordinates of normal vector estimates such as |y1−y2|, and let Tz be a threshold value for an absolute difference in z coordinates of normal vector estimates such as |z1−z1| Then, if |x1−x2|>Tx or |y1−y2|>Ty or |z1−z2|>Tz, then V1, V2, or both V1 and V2 can be considered to be outliers.

In other embodiments, BRDF/lighting parameters for the particular pixel can be compared to BRDF/lighting parameters for a neighborhood of pixels, where a neighborhood of the particular pixel can specified in terms of locations on the object (e.g., a neighborhood of pixels to particular pixel PIX_PP1 whose Ploc values are within a predetermined distance from the location Ploc(PIX_PP1)) or in terms of locations in a pixel grid location (e.g., for an image stored as a rectangular grid of pixels, a neighborhood of pixels to particular pixel PIX_PP1 within a predetermined distance within the grid of pixels to PIX_PP1). Then, if a difference between some or all of the BRDF/lighting parameters for two pixels within the neighborhood of pixels exceeds one or more difference thresholds, such as the Tx, Ty, and Tz thresholds discussed in the paragraph above, one (or both) groups of BRDF/lighting parameters can be labeled as outlier parameter(s). Other techniques for determining neighborhoods of pixels and outlying normal estimates are possible as well.

Figure 4:
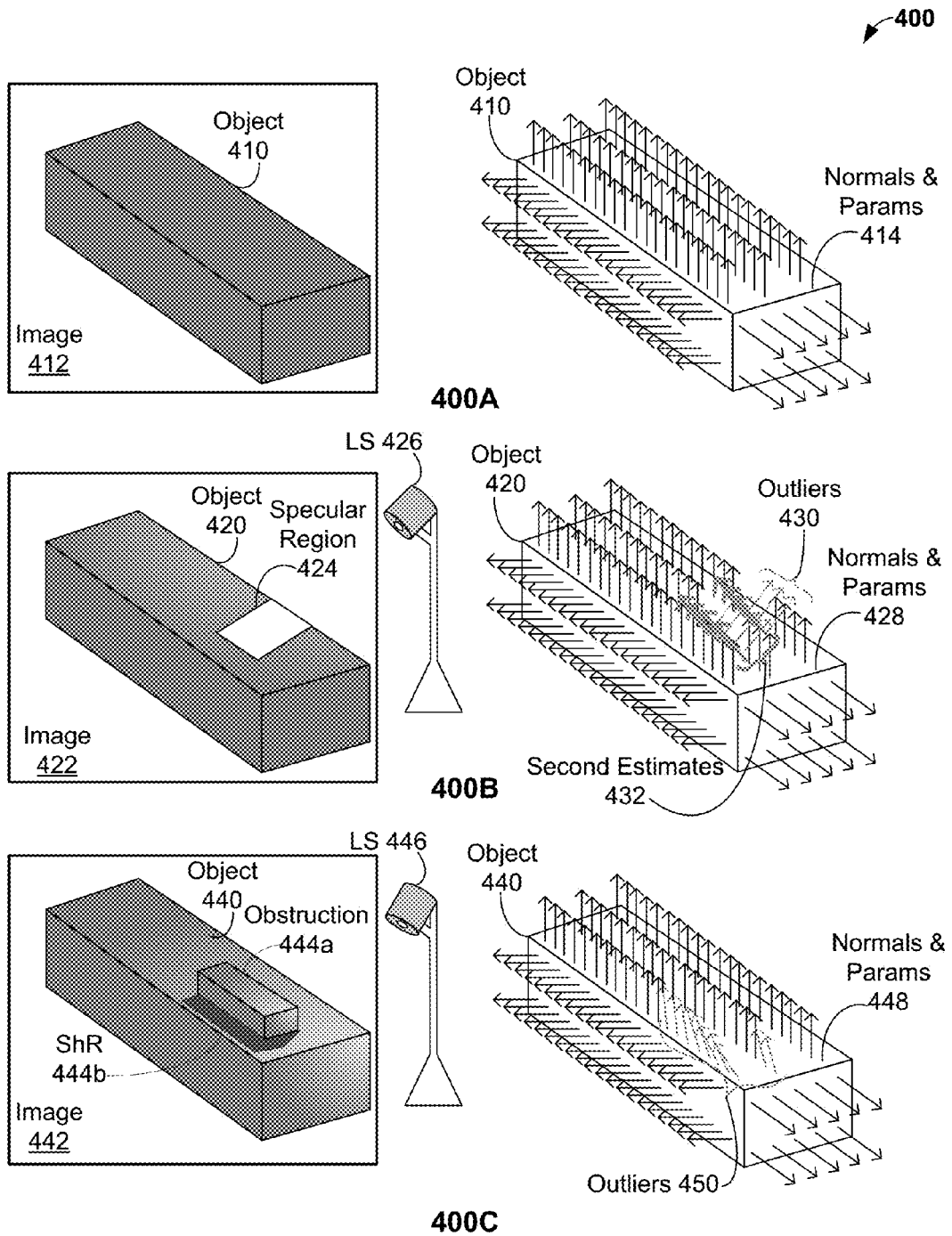
FIG. 4 shows example determinations of normal vectors from corresponding images of objects, in accordance with an example embodiment.

A left side of FIG. 4 at 400A shows that image 412 of example object 410 is captured. In scenario 400, object 410 is a diffuse object. Then, using the first lighting model discussed above, first estimates of normal vectors and lighting parameters 414, shown in FIG. 4 as normals & params 414, that can be used for a BRDF of object 410 can be determined. FIG. 4 shows, at a right side of FIG. 4 at 400A, first estimates of normal vectors and lighting parameters 414 do not include outliers. Thus, a second lighting model may not be needed to determine normal vectors and lighting parameters to object 410.

However, at the left side of FIG. 4 at 400B, image 422 of object 420 is captured. Image 422 includes specular region 422 in the direction of light source (LS) 426, and so object 420 is not a diffuse object. Using the first lighting model discussed above, first estimates of normal vectors and lighting parameters 428 of object 420 can be determined, as shown on object 420 at a right side of 400B of FIG. 4. First estimates of normal vectors and lighting parameters 428 can include outlier vectors and lighting parameters (or outliers) 430 obtained from locations of specular region 424. Estimated normal vectors and lighting parameters in locations corresponding to specular region 424 can be marked as outliers since a diffuse lighting model may not accurately model light from specular regions; i.e., RGB values for pixels corresponding to specular region 424 can be larger than corresponding RGB values for pixels of a diffuse region or object. In some embodiments, specular region 424 can be determined based on the lighting conditions used in capturing image 442; e.g., a location of lighting source 426, specularity and other properties of object 420, intensities and/or colors of light provided by lighting source 426.

Then, for each outlier vector in outliers 430, a second estimate of the normal, shown in on the right side of FIG. 4 at 400B as second estimates 432, can be determined. In some embodiments, second estimates 432 can include estimates for other parameters of a BRDF; e.g., albedo, roughness, and/or reflectivity values. For each pixel PO=PO1, PO2 . . . , that is associated with a normal (or other parameter) estimate N1(PO1), N1(PO2), . . . has been marked as an outlier, a second lighting model can be used to determine a second normal (or other parameter) estimate for pixel PO. The second lighting model can be a specular lighting model, such as described using Equations 3 and 4 above. For example, for each outlier normal vector, the second lighting model can be applied to a pixel PO associated with the outlier vector. Then, using Equation 3 as the lighting model, with n=1 and with one light source; e.g., i=1, for each outlier vector at pixel PO, N1(PO), let $\theta_2$=arc cos(I·V)/2. Then, a second normal estimate N2 at pixel PO, N2(PO), can be determined by rotating incident light vector I by $\theta_2$. N2(PO) can be scaled by the albedo at pixel PO, $\rho$(PO), by dividing N2(PO) by $\rho$(PO). In some embodiments, the albedo parameter at pixel PO, $\rho$(PO), can be re-estimated using the second lighting model.

In some embodiments, a combination of the first normal (or other parameter) estimate N1(PO) and the second normal (or other parameter) estimate N2(PO) used as the normal (or other parameter) estimate for pixel PO; e.g., a normal (or other parameter) estimate N(PO) can be set to:

$$N(PO)=w1*N1(PO)+w2*N2(PO) \quad (6)$$

where: w1 and w2 are weights for combining the normal (or other parameter) estimates In some embodiments, w1+w2=1, for w1≥0 and w2≥0.

For example, if w1=w2=0.5 for Equation 6, N(PO) can be determined as a simple average of N1(PO) and N2(PO). In other embodiments, the second normal estimate N2(PO) can replace the first normal estimate N1(PO) as the normal estimate for pixel PO; i.e., Equation 6 can be used with w1=0, w2=1. For non-outlier vectors, Equation 6 can be used with w1=1 and w2=0; i.e., the second normal (or other parameter) estimate is not used. Many other techniques for determining a normal (or other parameter) estimate using two or more lighting models are possible as well.

For other lighting parameters of a BRDF than normal values, similar weighted estimates to those calculated using Equation 6 can be determined based on estimates/values determined from the first and second lighting models. These other lighting parameters can include but are not limited to an albedo parameter $\rho$, roughness parameters m and $\sigma$, and/or other lighting parameters; e.g., a reflectivity parameter, a shading parameter. In some embodiments, the weight values w1 and w2 in Equation 6 can be used as lighting parameters; e.g., w1 can be an albedo estimate, and w2 can be a reflectivity estimate.

In other embodiments, light captured at a pixel PIX can be considered as a combination of diffuse and specular light, such as expressed in Equation 5. Then, for each pixel corresponding to an outlier vector, specular light can be subtracted out for the pixel PIX; e.g., in terms of Equation 5, $L_R$ can be set to the pixel color values (PIX_r, PIX_g, PIX_b), and light corresponding to specular light, $k_S L_{RS}$, as determined by the second lighting model can be subtracted from $L_R$, and so only diffuse light plus higher order terms are left as the value of $L_R$. The higher order terms can be approximated; e.g., as a sum of spherical harmonics of fixed order.

Then, the light at pixel PIX can be model using a function, such as a BRDF, of the normal and lighting parameters mentioned above; e.g., the estimated normal vector plus the albedo, reflectivity, and roughness values at the point. The normal vector can be expressed in terms three single byte values: one byte (e.g., assuming 8 bits=1 byte) for each of an X-dimension component, a Y-dimension component, and a Z-dimension component The albedo can be expressed in terms of the RGB color model using 3 bytes (e.g., 24 bits) of information, and the reflectivity and roughness values can each be scaled to fit into a single byte value.

Then, for each pixel, a BRDF estimate is expressible using 64 bits or 8 bytes:

24 bits or 3 bytes for the normal estimate
24 bits or 3 bytes for the albedo estimate
8 bits or 1 byte for the reflectivity estimate
8 bits or 1 byte for the roughness estimate.

These values of the estimated normal vector plus the albedo, reflectivity, and roughness values can be stored in lighting storage data 320, as shown in FIG. 3. Typically, images are stored using a RGB color model with one 8-bit color value for each of red light, green light, and blue light for each pixel. That is, 24 bits are stored per pixel in an uncompressed color image. Using the above techniques, normal estimates, albedo estimates, reflectivity estimates, and a roughness estimates can be stored in less storage than three uncompressed color images; i.e., in less than 72 bits per pixel. Additional compression techniques can be used to further compress an amount of lighting storage data required to store normal estimates, albedo estimates, reflectivity estimates, and a roughness estimates; e.g., run-length encoding, Huffman-coding based compression, compression based on discrete cosine transforms such as used in JPEG images. Other examples are possible as well.

Other lighting models than specular lighting models can be used for second lighting models. At a left side of 400C of FIG. 4, image 442 of object 440 is captured. Image 442 is captured with obstruction 444a on object 440. As such, less light from light source 446 reaches object 440 in shaded region (ShR) 444b behind obstruction 444a than reaches object 440 in front of or beside obstruction 444a. Using the first lighting model discussed above, first estimates of normal vectors and lighting parameters 448 of object 440 can be determined, as shown on object 440 at a right side of 400C of FIG. 4. First estimates of normal vectors and lighting parameters 448 can include outliers 450 obtained from pixels corresponding to shaded region 444b. In some embodiments, shaded region 444b can be determined based on the lighting conditions used in capturing image 442; e.g., a location of lighting source 446, a location of obstruction 444a, intensities and/or colors of light provided by lighting source 446.

Estimated normal vectors and lighting parameters 448 generated for pixels corresponding to shaded region 444b can be marked as outliers since a diffuse lighting model may not accurately model light from shaded regions; i.e., RGB values for pixels corresponding to shaded region 444b can be smaller than corresponding RGB values for pixels of non-shaded regions or objects. In instances of objects with shaded regions, other lighting models than specular lighting models can be used as second lighting models; e.g., lighting models that take occluded/shaded regions of objects into account.

One technique to account for shaded regions of an object is to move the camera and/or light source(s) to light previously-shaded regions and capture additional image(s). Then, for each of the additional images, normal vector estimates, and estimates of additional lighting parameters, such as the above-mentioned albedo, reflectivity, and roughness parameters, can be determined.

Figure 5:
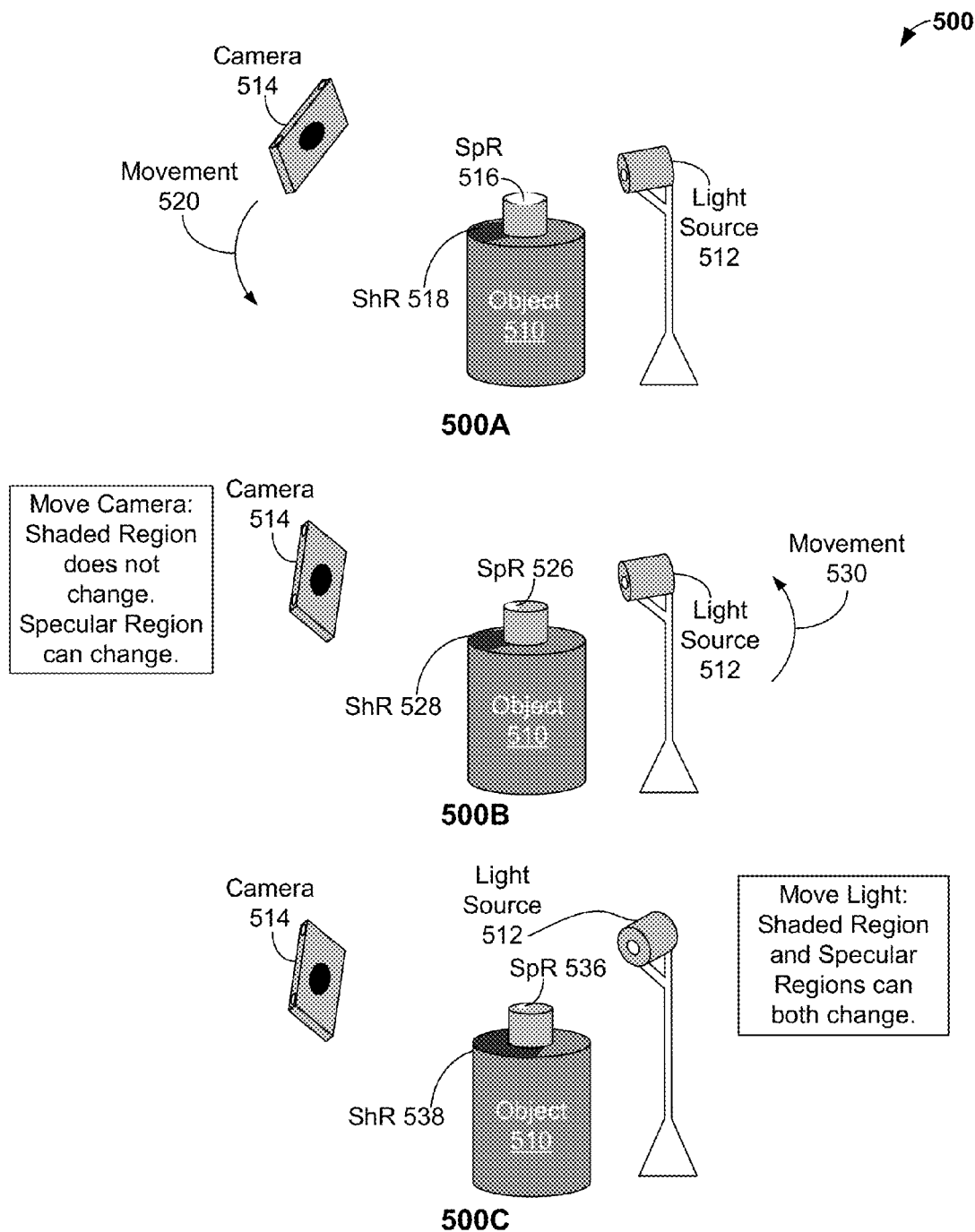
FIG. 5 shows another scenario for determining object properties from images of an object, in accordance with an example embodiment.

FIG. 5 shows scenario 500 for determining object properties from images of an object, in accordance with an example embodiment. In some scenarios, such as scenario 500, multiple images of an object can be obtained. At 500A, FIG. 5 shows camera 514 capturing an image of object 510 lighted by light source 512 with specular region (SpR) 516 and shaded region 518.

In scenario 500, after capturing the image of object 510 at 500A, camera 514 moves following movement 520 to a position depicted at 500B of FIG. 5. At 500B, FIG. 5 shows camera 514 capturing an image of object 510 lighted by light source 512 with specular region 526 and shaded region 528. FIG. 5 shows that specular region 526 differs from specular region 516, but shaded regions 518 and 528 being the same. This can be due to movement of camera 514, which changes a view vector to object 510 and so changes a region of object 510 that reflects light directly to camera 514. This region of object 510 that reflects light directly to camera 514 can correspond to a specular region; e.g., specular region 526.

A camera-only movement, such as movement 520, can be detected by examination of shaded regions of objects in images taken before and after the camera-only movement. As light source 512 did not move relative to object 510 as part of movement 520, then a region of light emitted by light source 512 and occluded by object 510 does not change; e.g., shaded regions 518 and 528 are the same. So, camera-only movements between images can be detected when a difference in the images indicates change in specular region(s) but without changes in shaded region(s).

In scenario 500, after capturing the image of object 510 at 500B, light source 512 moves following movement 530 to a position depicted at 500C of FIG. 5. At 500C, FIG. 5 shows camera 514 capturing an image of object 510 lighted by light source 512 with specular region 536 and shaded region 538. FIG. 5 shows that specular region 536 differs from specular region 526 and shaded region 538 differs from shaded region 528.

This can be due to movement of light source 512, which changes an incident light vector to object 510 with a corresponding change in mirror vectors, and so can changes a region of object 510 that reflects light directly to camera 514. Also, as a direction of incident light changes, regions of light emitted by light source 512 occluded by object 510 can change. That is, movement of a light source, such as light source 512, can change both specular regions and shaded regions.

Movements of light sources, camera, and lack of camera and light source movements can be detected by observation of specular and shaded regions between two images of a common scene or object. A light-source-only movement can be detected when both specular regions and shaded regions change between the two images. If specular regions change between the two images without changes in shaded regions, a camera-only movement can be detected. Further, if neither specular regions nor shaded regions change between the two images, then the camera and the light source did not change position between images, and so a lack of movement of either a camera or a light source can be detected.

One technique to account for shaded regions of an object is to move the camera and/or light source(s) to light previously-shaded regions and capture additional image(s). Then, for each of the additional images, normal vector estimates, and estimates of additional lighting parameters, such as the above-mentioned albedo, reflectivity, and roughness parameters, can be determined.

For each image captured in scenario 500 and perhaps other or different images of object 510, normal and lighting parameter (e.g., albedo, reflectivity, roughness) estimates can be determined for the pixels in the image using the techniques described above in the context of FIGS. 1-4. Then, the normal and lighting parameters estimated for a given location in two or more of the images can be used as initial conditions for a nonlinear least-square fit algorithm, such as a Gauss-Newton algorithm for solving the nonlinear least squares problem.

In some scenarios, normal vectors and/or estimates of normal vectors for object 510 can be provided. In those scenarios, normal vector estimates determined by the above-referenced techniques can be discarded, not calculated, or used to improve the provided normal vectors; e.g., the provided normal vectors and calculated normal vectors can be input to the above-mentioned nonlinear least-square fit algorithm.

Example Data Network

Figure 6:
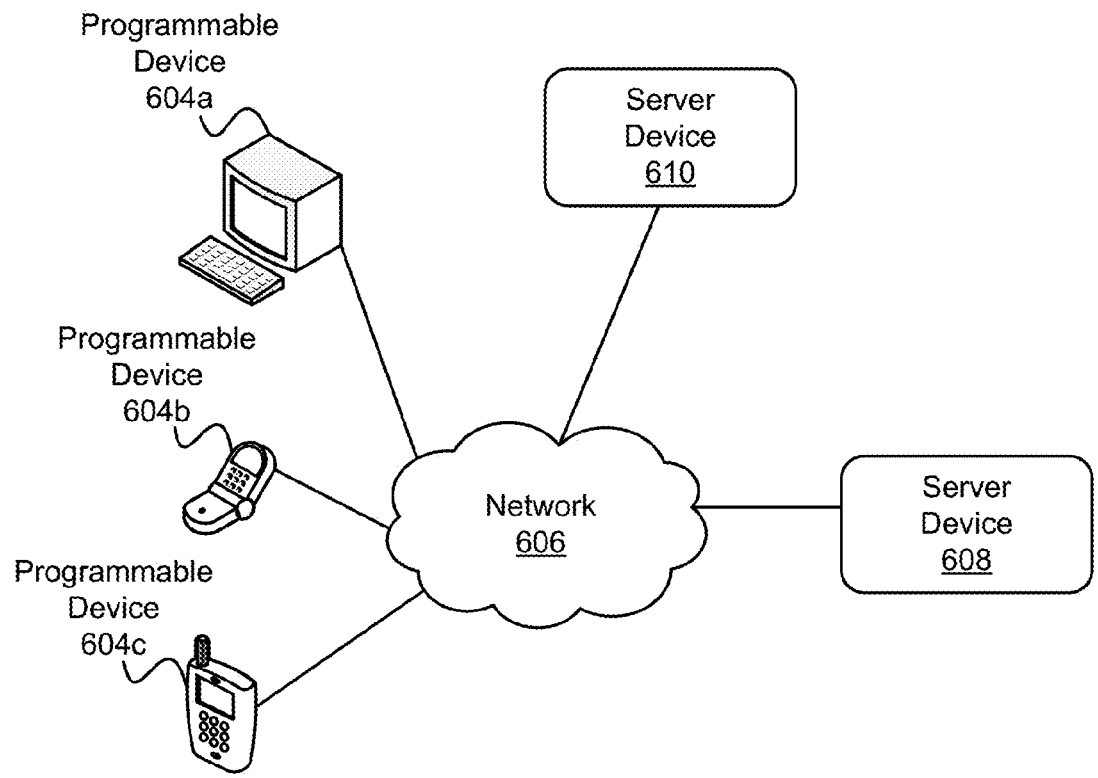
FIG. 6 depicts a distributed computing architecture, in accordance with an example embodiment.

FIG. 6 shows server devices 608, 610 configured to communicate, via network 606, with programmable devices 604a, 604b, and 604c. Network 606 may correspond to a LAN, a wide area network (WAN), a corporate intranet, the public Internet, or any other type of network configured to provide a communications path between networked computing devices. The network 606 may also correspond to a combination of one or more LANs, WANs, corporate intranets, and/or the public Internet. One or more of server devices 608, 610, network 606, and programmable devices 604a, 604b, and 604c can be configured to perform part or all of method 100 and/or some or all of the herein-described functionality of computing device 300.

Although FIG. 6 only shows three programmable devices, distributed application architectures may serve tens, hundreds, or thousands of programmable devices. Moreover, programmable devices 604a, 604b, and 604c (or any additional programmable devices) may be any sort of computing device, such as an ordinary laptop computer, desktop computer, network terminal, wireless communication device (e.g., a cell phone or smart phone), and so on. In some embodiments, programmable devices 604a, 604b, and 604c may be dedicated to the design and use of software applications. In other embodiments, programmable devices 604a, 604b, and 604c may be general purpose computers that are configured to perform a number of tasks and need not be dedicated to software development tools. In still other embodiments, programmable devices 604a, 604b, and/or 604c can be configured to perform some or all of the herein-described functionality of a computing device.

Server devices 608, 610 can be configured to perform one or more services, as requested by programmable devices 604a, 604b, and/or 604c. For example, server device 608 and/or 610 can provide content to programmable devices 604a-604c. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 608 and/or 610 can provide programmable devices 604a-604c with access to software for database, search, computation, graphical, audio, video, World Wide Web/Internet utilization, and/or other functions. Many other examples of server devices are possible as well.

Computing Device Architecture

Figure 7A:
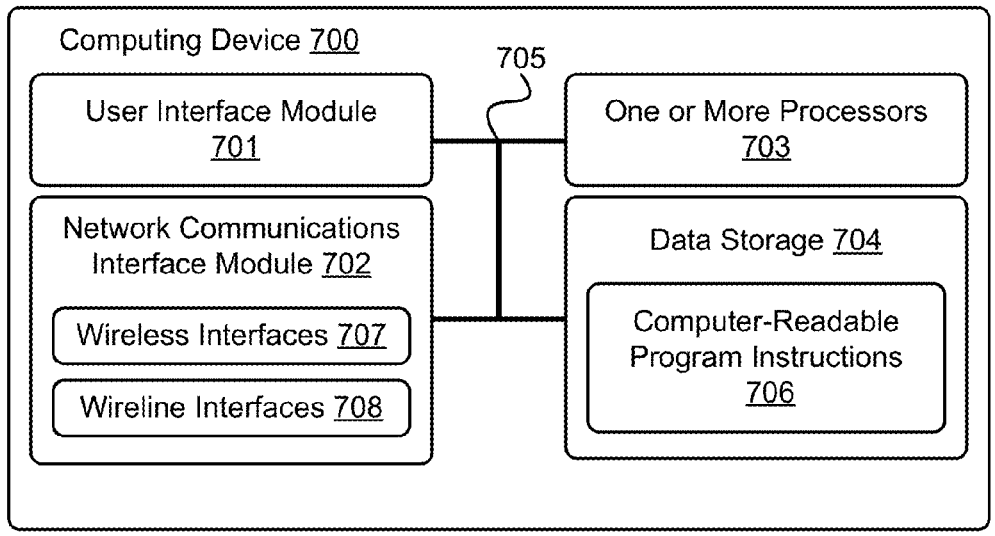
FIG. 7A is a block diagram of a computing device, in accordance with an example embodiment.

FIG. 7A is a block diagram of a computing device (e.g., system) in accordance with an example embodiment. In particular, computing device 700 shown in FIG. 7A can be configured to perform part or all of method 100 and/or some or all of the herein-described functionality of computing device 300, one or more functions of server devices 608, 610, network 606, and/or one or more of programmable devices 604a, 604b, and 604c. Computing device 700 may include a user interface module 701, a network-communication interface module 702, one or more processors 703, and data storage 704, all of which may be linked together via a system bus, network, or other connection mechanism 705.

User interface module 701 can be operable to send data to and/or receive data from external user input/output devices. For example, user interface module 701 can be configured to send and/or receive data to and/or from user input devices such as a keyboard, a keypad, a touch screen, a computer mouse, a track ball, a joystick, a camera, a voice recognition module, and/or other similar devices. User interface module 701 can also be configured to provide output to user display devices, such as one or more cathode ray tubes (CRT), liquid crystal displays (LCDs), light emitting diodes (LEDs), displays using digital light processing (DLP) technology, printers, light bulbs, and/or other similar devices, either now known or later developed. User interface module 701 can also be configured to generate audible output(s), such as a speaker, speaker jack, audio output port, audio output device, earphones, and/or other similar devices.

Network-communications interface module 702 can include one or more wireless interfaces 707 and/or one or more wireline interfaces 708 that are configurable to communicate via a network, such as network 606 shown in FIG. 6. Wireless interfaces 707 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 708 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 702 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and DSA. Other cryptographic protocols and/or algorithms can be used as well or in addition to those listed herein to secure (and then decrypt/decode) communications.

Processors 703 can include one or more general purpose processors and/or one or more special purpose processors (e.g., digital signal processors, application specific integrated circuits, etc.). Processors 703 can be configured to execute computer-readable program instructions 706a that are contained in the data storage 704 and/or other instructions as described herein.

Data storage 704 can include one or more computer-readable storage media that can be read and/or accessed by at least one of processors 703. For example, data storage 704 can provide memory for the herein-described instructions; e.g., instructions 310, and/or lighting data storage; e.g., lighting data storage 320. The one or more computer-readable storage media can include volatile and/or non-volatile storage components, such as optical, magnetic, organic or other memory or disc storage, which can be integrated in whole or in part with at least one of processors 703. In some embodiments, data storage 704 can be implemented using a single physical device (e.g., one optical, magnetic, organic or other memory or disc storage unit), while in other embodiments, data storage 704 can be implemented using two or more physical devices.

Data storage 704 can include computer-readable program instructions 706. Some of computer-readable program instructions 706 can be instructions for operating system 706a. Operating system 706a can be used to schedule applications, threads, and other processes for execution on processor(s) 703, execute applications, threads, and/or other processes using processor(s) 703, allocate part or all of data storage 704, and control devices; e.g., devices used as user interface module 701 and/or network communications interface module 702. In some embodiments, data storage 704 can additionally include storage required to perform at least part of the herein-described methods and techniques and/or at least part of the functionality of the herein-described devices and networks.

Cloud-Based Servers

Figure 7B:
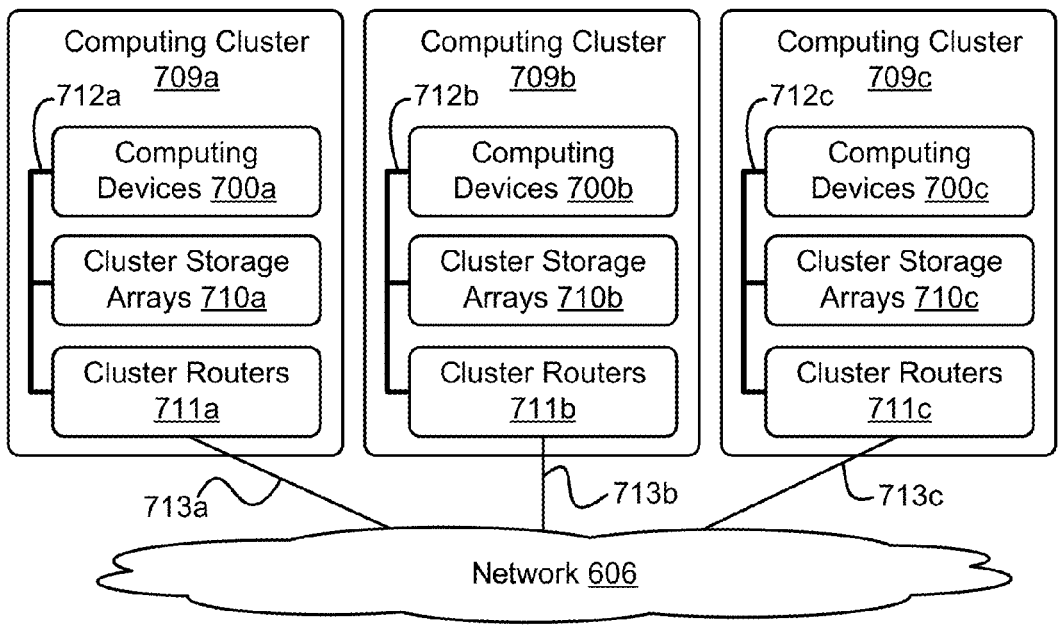
FIG. 7B depicts a cloud-based server system, in accordance with an example embodiment.

FIG. 7B depicts a network 606 of computing clusters 709a, 709b, 709c arranged as a cloud-based server system in accordance with an example embodiment. Server devices 608 and/or 610 can be cloud-based devices that store program logic and/or data of cloud-based applications and/or services. In some embodiments, server devices 608 and/or 610 can be a single computing device residing in a single computing center. In other embodiments, server device 608 and/or 610 can include multiple computing devices in a single computing center, or even multiple computing devices located in multiple computing centers located in diverse geographic locations. For example, FIG. 6 depicts each of server devices 608 and 610 residing in different physical locations.

In some embodiments, data and services at server devices 608 and/or 610 can be encoded as computer readable information stored in non-transitory, tangible computer readable media (or computer readable storage media) and accessible by programmable devices 604a, 604b, and 604c, and/or other computing devices. In some embodiments, data at server device 608 and/or 610 can be stored on a single disk drive or other tangible storage media, or can be implemented on multiple disk drives or other tangible storage media located at one or more diverse geographic locations.

FIG. 7B depicts a cloud-based server system in accordance with an example embodiment. In FIG. 7B, the functions of server device 608 and/or 610 can be distributed among three computing clusters 709a, 709b, and 709c. Computing cluster 709a can include one or more computing devices 700a, cluster storage arrays 710a, and cluster routers 711a connected by a local cluster network 712a. Similarly, computing cluster 709b can include one or more computing devices 700b, cluster storage arrays 710b, and cluster routers 711b connected by a local cluster network 712b. Likewise, computing cluster 709c can include one or more computing devices 700c, cluster storage arrays 710c, and cluster routers 711c connected by a local cluster network 712c.

In some embodiments, each of the computing clusters 709a, 709b, and 709c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 709a, for example, computing devices 700a can be configured to perform various computing tasks of electronic communications server 712. In one embodiment, the various functionalities of electronic communications server 712 can be distributed among one or more of computing devices 700a, 700b, and 700c. Computing devices 700b and 700c in computing clusters 709b and 709c can be configured similarly to computing devices 700a in computing cluster 709a. On the other hand, in some embodiments, computing devices 700a, 700b, and 700c can be configured to perform different functions.

In some embodiments, computing tasks and stored data associated with server devices 608 and/or 610 can be distributed across computing devices 700a, 700b, and 700c based at least in part on the processing requirements of server devices 608 and/or 610, the processing capabilities of computing devices 700a, 700b, and 700c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 710a, 710b, and 710c of the computing clusters 709a, 709b, and 709c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 608 and/or 610 can be distributed across computing devices 700a, 700b, and 700c of computing clusters 709a, 709b, and 709c, various active portions and/or backup portions of these components can be distributed across cluster storage arrays 710a, 710b, and 710c. For example, some cluster storage arrays can be configured to store the data of server device 608, while other cluster storage arrays can store data of server device 610. Additionally, some cluster storage arrays can be configured to store backup versions of data stored in other cluster storage arrays.

The cluster routers 711a, 711b, and 711c in computing clusters 709a, 709b, and 709c can include networking equipment configured to provide internal and external communications for the computing clusters. For example, the cluster routers 711a in computing cluster 709a can include one or more internet switching and routing devices configured to provide (i) local area network communications between the computing devices 700a and the cluster storage arrays 701a via the local cluster network 712a, and (ii) wide area network communications between the computing cluster 709a and the computing clusters 709b and 709c via the wide area network connection 713a to network 606. Cluster routers 711b and 711c can include network equipment similar to the cluster routers 711a, and cluster routers 711b and 711c can perform similar networking functions for computing clusters 709b and 709b that cluster routers 711a perform for computing cluster 709a.

In some embodiments, the configuration of the cluster routers 711a, 711b, and 711c can be based at least in part on the data communication requirements of the computing devices and cluster storage arrays, the data communications capabilities of the network equipment in the cluster routers 711a, 711b, and 711c, the latency and throughput of local networks 712a, 712b, 712c, the latency, throughput, and cost of wide area network links 713a, 713b, and 713c, and/or other factors that can contribute to the cost, speed, fault-tolerance, resiliency, efficiency and/or other design goals of the moderation system architecture.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

It should be understood that other embodiments can include more or less of each element shown in a given figure. Further, some of the illustrated elements can be combined or omitted. Yet further, an example embodiment can include elements that are not illustrated in the figures.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

Moreover, a block that represents one or more information transmissions may correspond to information transmissions between software and/or hardware modules in the same physical device. However, other information transmissions may be between software modules and/or hardware modules in different physical devices.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, and/or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A computer-implemented method, comprising:
receiving a first image of an object at a computing device, the image comprising a plurality of pixels, wherein the plurality of pixels have a plurality of pixel values;
for a designated pixel of the first image, the computing device:
determining a first estimate of a bi-directional lighting function (BRDF) of the object for the designated pixel by applying a first lighting model,
determining a second estimate of the BRDF of the object for the designated pixel by applying a second lighting model, wherein the first lighting model differs from the second lighting model,
determining whether the first estimate of the BRDF of the object for the designated pixel is an outlier estimate, wherein the outlier estimate is based on a difference between the first estimate and a pixel value for the designated pixel,
after determining that the first estimate of the BRDF of the object for the designated pixel is an outlier estimate:
determining a third estimate of the BRDF of the object for the designated pixel based on the first estimate of the BRDF and the second estimate of the BRDF,
determining a first shaded region of the object based on the outlier estimate, and
storing at least the third estimate of the BRDF in lighting-storage data;
receiving a second image of the object at the computing device, wherein the second image comprises a second plurality of pixels;
determining a second shaded region of the object based on the second image using the computing device;
determining whether a movement between the first image and the second image occurred based on the first shaded region and the second shaded region, wherein the movement is one or more of: a camera movement and a light-source movement and
providing the lighting-storage data using the computing device.

2. The computer-implemented method of claim 1, wherein determining the third estimate of the BRDF comprises:
after determining that the first estimate of the BRDF is the outlier estimate, determining the third estimate of the BRDF of the object for the designated pixel based on the second estimate.

3. The computer-implemented method of claim 1, further comprising:
for a second designated pixel of the first image, the second designated pixel differing from the designated pixel, the computing device:
determining a first estimate of a BRDF of the object for the second designated pixel by applying the first lighting model,
determining whether the first estimate of the BRDF of the object for the second designated pixel is an outlier estimate, and
after determining that the first estimate of the BRDF of the object for the second designated pixel is not an outlier estimate, determining a third estimate of the BRDF for the second designated pixel based on the first estimate of the BRDF of the object for the second designated pixel.

4. The computer-implemented method of claim 1, wherein the first lighting model is configured to model diffuse reflection of light.

5. The computer-implemented method of claim 4, wherein determining the first estimate of the BRDF for the object comprises determining a value of an albedo of the object for the designated pixel and a normal vector of the object for the designated pixel.

6. The computer-implemented method of claim 1, wherein the second lighting model is configured to model specular reflection of light.

7. The computer-implemented method of claim 6, wherein determining the second estimate of the BRDF for the object comprises determining a reflectivity value of the object for the designated pixel.

8. The computer-implemented method of claim 1, wherein the BRDF is associated with at least one lighting parameter value, and wherein storing at least the third estimate of the BRDF in the lighting-storage data comprises:
  determining a pre-determined number of bits to store the at least one lighting parameter value for the third estimate of the BRDF; and
  storing the at least one lighting parameter value for the third estimate of the BRDF using no more than the pre-determined number of bits.

9. The computer-implemented method of claim 1, further comprising:
  for a third designated pixel of the second plurality of pixels, the computing device:
    determining a second-image estimate of a BRDF of the object for the third designated pixel by applying at least the first lighting model,
    determining a first-image estimate of the BRDF of the object for the third designated pixel, wherein the first-image estimate is determined for a pixel of the plurality of pixels that corresponds to the third designated pixel; and
    determining a combined estimate of the BRDF of the object for the third designated pixel by combining the first-image estimate and the second-image estimate.

10. The computer-implemented method of claim 1, wherein the lighting-storage data is configured to store, for each pixel of the plurality of pixels, at least an estimate of a normal vector, an albedo value, a reflectivity value, and a roughness value.

11. A computing device, comprising:
  a processor; and
  a non-transitory computer-readable medium configured to store at least lighting storage data and program instructions, when the program instructions are executed by the processor, the program instructions cause the computing device to carry out functions comprising:
    receiving a first image of an object, the first image comprising a plurality of pixels, wherein the plurality of pixels have a plurality of pixel values;
    for a designated pixel of the first image:
      determining a first estimate of a bi-directional lighting function (BRDF) of the object for the designated pixel by applying a first lighting model,
      determining a second estimate of the BRDF of the object for the designated pixel by applying a second lighting model, wherein the first lighting model differs from the second lighting model,
      determining whether the first estimate of the BRDF of the object for the designated pixel is an outlier estimate, wherein the outlier estimate is based on a difference between the first estimate and a pixel value for the designated pixel,
      after determining that the first estimate of the BRDF of the object for the designated pixel is an outlier estimate:
        determining a third estimate of the BRDF of the object for the designated pixel based on the first estimate of the BRDF and the second estimate of the BRDF, and
        determining a first shaded region of the object based on the outlier estimate, and
        storing at least the third estimate of the BRDF in the lighting-storage data;
    receiving a second image of the object, wherein the second image comprises a second plurality of pixels;
    determining a second shaded region of the object based on the second image;
    determining whether a movement between the first image and the second image occurred based on the first shaded region and the second shaded region, wherein the movement is one or more of: a camera movement, a light-source movement and
    providing the lighting-storage data.

12. The computing device of claim 11, wherein determining the second estimate of the BRDF comprises:
  after determining that the first estimate of the BRDF is the outlier estimate, determining the third estimate of the BRDF of the object for the designated pixel based on the second estimate.

13. The computing device of claim 11, wherein the functions further comprise:
  for a second designated pixel of the first image, the second designated pixel differing from the designated pixel:
    determining a first estimate of a BRDF of the object for the second designated pixel by applying the first lighting model,
    determining whether the first estimate of the BRDF of the object for the second designated pixel is an outlier estimate, and
    after determining that the first estimate of the BRDF of the object for the second designated pixel is not an outlier estimate, determining a third estimate of the BRDF for the second designated pixel based on the first estimate of the BRDF of the object for the second designated pixel.

14. The computing device of claim 11, wherein the first lighting model is configured to model diffuse reflection of light, and wherein determining the first estimate of the BRDF of the object comprises determining a value of an albedo of the object for the designated pixel and a normal vector of the object for the designated pixel.

15. The computing device of claim 11, wherein the second lighting model is configured to model specular reflection of light, and wherein the determining the second estimate of the BRDF for the object comprises determining a reflectivity value of the object for the designated pixel.

16. A non-transitory computer-readable medium configured to store program instructions that, when executed by a processor of a computing device, cause the computing device to carry out functions comprising:
  receiving a first image of an object, the first image comprising a plurality of pixels, wherein the plurality of pixels have a plurality of pixel values;
  for a designated pixel of the first image:
    determining a first estimate of a bi-directional lighting function (BRDF) of the object for the designated pixel by applying a first lighting model, determining a second estimate of the BRDF of the object for the designated pixel by applying a second lighting model, wherein the first lighting model differs from the second lighting model, determining whether the first estimate of the BRDF of the object for the designated pixel is an outlier estimate, wherein the outlier estimate is based on a difference between the first estimate and a pixel value for the designated pixel, after determining that the first estimate of the BRDF of the object for the designated pixel is an outlier estimate:

determining a third estimate of the BRDF of the object for the designated pixel based on the first estimate of the BRDF and the second estimate of the BRDF, determining a first shaded region of the object based on the outlier estimate, and storing at least the third estimate of the BRDF in the lighting-storage data;

receiving a second image of the object, wherein the second image comprises a second plurality of pixels;

determining a second shaded region of the object based on the second image;

determining whether a movement between the first image and the second image occurred based on the first shaded region and the second shaded region, wherein the movement is one or more of: a camera movement and a light-source movement and providing the lighting-storage data.

17. The non-transitory computer-readable medium of claim 16, wherein determining the second estimate of the BRDF comprises:

after determining that the first estimate of the BRDF is the outlier estimate, determining the third estimate of the BRDF of the object for the designated pixel based on the second estimate.

18. The non-transitory computer-readable medium of claim 16, wherein the functions further comprise:

for a second designated pixel of the first image, the second designated pixel differing from the designated pixel:

determining a first estimate of a BRDF of the object for the second designated pixel by applying the first lighting model, determining whether the first estimate of the BRDF of the object for the second designated pixel is an outlier estimate, and after determining that the first estimate of the BRDF of the object for the second designated pixel is not an outlier estimate, determining a third estimate of the BRDF for the second designated pixel based on the first estimate of the BRDF of the object for the second designated pixel.

19. The non-transitory computer-readable medium of claim 16, wherein the first lighting model is configured to model diffuse reflection of light, and wherein determining the first estimate of the BRDF of the object comprises determining a value of an albedo of the object for the designated pixel and a normal vector of the object for the designated pixel.

20. The non-transitory computer-readable medium of claim 16, wherein the second lighting model is configured to model specular reflection of light, and wherein determining the second estimate of the BRDF of the object comprises determining a reflectivity value of the object for the designated pixel.

* * * * *